United States Patent
Gokhman et al.

(10) Patent No.: US 8,966,359 B2
(45) Date of Patent: Feb. 24, 2015

(54) WEB APPLICATION CONTENT MAPPING

(75) Inventors: Igor Gokhman, Haifa (IL); Boris Rozenberg, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 13/345,713

(22) Filed: Jan. 26, 2012

(65) Prior Publication Data

US 2013/0198603 A1 Aug. 1, 2013

(51) Int. Cl.
*G06F 17/30* (2006.01)

(52) U.S. Cl.
USPC .......................................... 715/234

(58) Field of Classification Search
CPC ....................................... G06F 17/30
USPC .......................................... 715/234
See application file for complete search history.

(56) References Cited

U.S. PATENT DOCUMENTS

| 7,958,232 B1* | 6/2011 | Colton et al. ............ 709/224 |
| 2006/0041637 A1* | 2/2006 | Jerrard-Dunne ......... 709/219 |
| 2008/0244509 A1* | 10/2008 | Buchs et al. ............ 717/106 |
| 2011/0078556 A1 | 3/2011 | Prasad et al. |
| 2012/0102101 A1* | 4/2012 | Wenig et al. ............ 709/203 |

OTHER PUBLICATIONS

Network Appliance, "Internet Content Adaptation Protocol (ICAP)", Version 1.01, Jul. 30, 2001.
Squid-Cache.org, "Squid: Optimising Web Delivery", Jul. 23, 2011. Can be found at : http://www.squid-cache.org/Intro.

* cited by examiner

*Primary Examiner* — Andrew Dyer
*Assistant Examiner* — Tionna Burke
(74) *Attorney, Agent, or Firm* — Roy Melzer

(57) ABSTRACT

A method of mapping between visual objects and web messages. The method comprises monitoring a plurality of web messages transmitted during at least one of loading and modifying a webpage having a plurality of dynamic visual objects by a browser of a client terminal, providing a dynamic model having a plurality of model elements each indicative of another of the plurality of dynamic visual objects, monitoring changes to the dynamic model to identify a first of the plurality of web messages has an effect on a first of the plurality of dynamic visual objects, and mapping, using a processor, between the first dynamic visual object and the first web message according to a source of the first web message.

25 Claims, 4 Drawing Sheets

WEB APPLICATION CONTENT MAPPING

BACKGROUND

The present invention, in some embodiments thereof, relates to network content adaptation and, more specifically, but not exclusively, to web application content mapping and content adjustment using web application content mapping.

During the last years, millions of applications which are accessed over a network such as the Internet, also known as web applications, have been developed, and have been published. Not long ago, an average web application was based on complete webpages generated dynamically by a web server. Each complete webpage was sent as a single hypertext transfer protocol (HTTP) message, provided in hypertext markup language (HTML) to a web browser which rendered it and presented to user. Such an HTTP message also contained visual elements such as scripts, style sheets and images which are related to the webpage and provided by the user. When a browsing user performs an action on such a webpage, a new HTTP message which includes all the visual elements of the complete webpage is sent to the browser to replace the previous display with a new one.

Nowadays, modern web application is based on Asynchronous loading of webpage content, such as asynchronous JavaScript and XML (AJAX). Asynchronous loading introduced separation of data from the presentation layer which implied by assembling a webpage from multiple HTTP messages. Usually, when such a webpage is loaded, one or more requests for content to be displayed are sent to a web server. In response, the web server sends the requested content in a number of HTTP messages. The browser inserts the content into visual elements in the loaded webpage, either as an update to previously loaded content or as a new entry created, for example on the fly by JavaScript execution. The above process may be performed after a user performs an action on the webpage, for example clicks on a button. Since the use of Asynchronous updating allows changing targeted pieces of information on a webpage instead of replacing all the content of the webpage with new content.

SUMMARY

According to some embodiments of the present invention, there is provided a computerized method of mapping one or more dynamic visual objects of a network document. The method comprises monitoring a plurality of web messages transmitted during at least one of loading and modifying a network document having a plurality of dynamic visual objects by a browser of a client terminal, providing a dynamic model having a plurality of model elements each indicative of another of the plurality of dynamic visual objects, monitoring changes to the dynamic model to identify a first of the plurality of web messages has an effect on a first of the plurality of dynamic visual objects, and automatically mapping, using a processor, between the first dynamic visual object and the first web message according to a source of the first web message.

According to some embodiments of the present invention, there is provided a system of mapping one or more dynamic visual objects of a network document. The system comprises a processor, a web message monitoring module which monitors a plurality of web messages transmitted during at least one of loading and modifying a network document having a plurality of dynamic visual objects by a browser, a memory which hosts a dynamic model having a plurality of model elements each indicative of another of the plurality of dynamic visual objects, and a mapping module which monitors changes to the dynamic model to identify a first of the plurality of web messages has an effect on a first of the plurality of dynamic visual objects and automatically maps, using the processor, between the first dynamic visual object and the first web message according to a source of the first web message.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
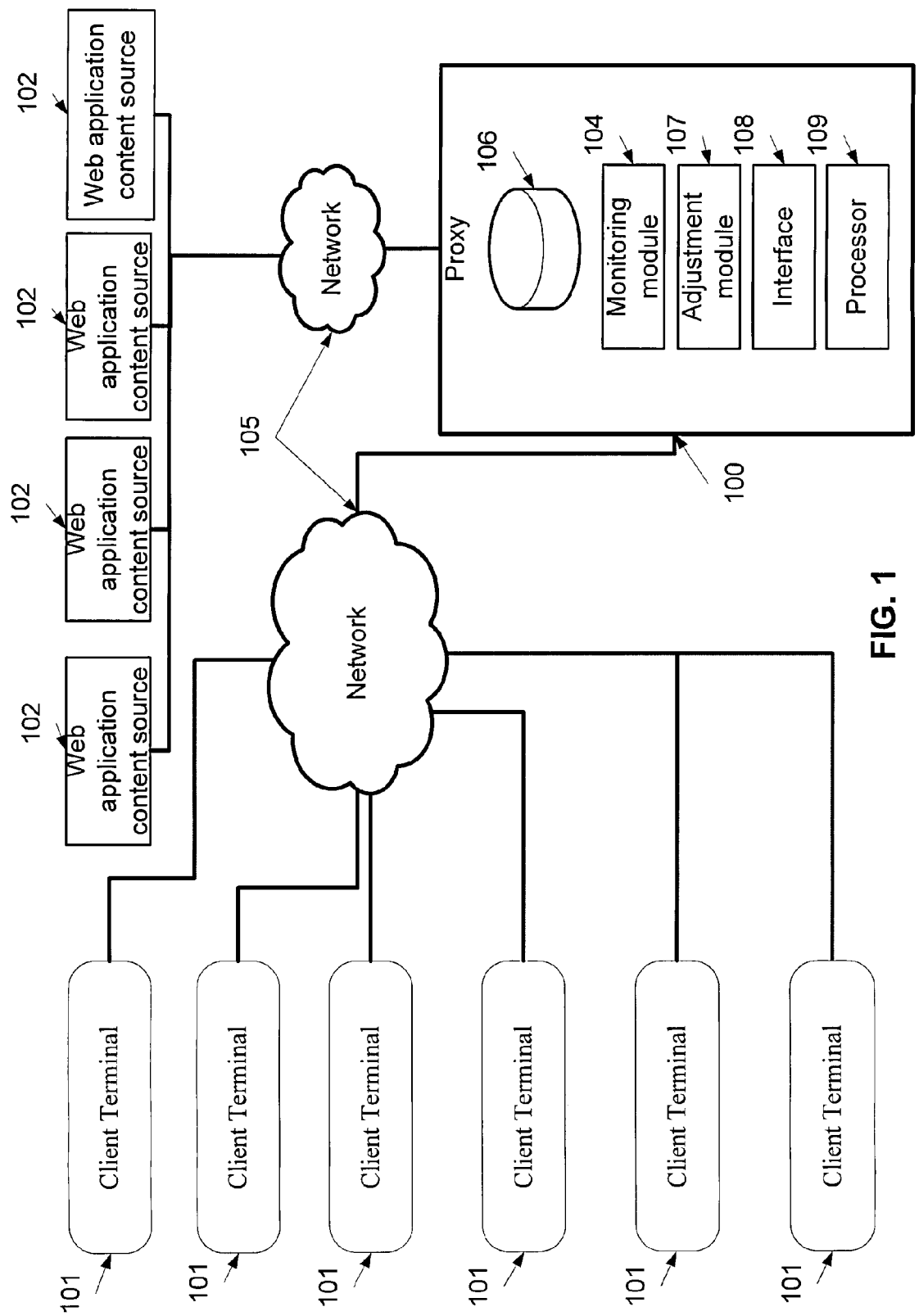
FIG. 1 is a schematic illustration of a proxy system designed for adjusting web application content in web messages which are sent from identified source(s) to any of a plurality of client terminals over a network, according to some embodiments of the present invention.

The present invention, in some embodiments thereof, relates to network content adaptation and, more specifically, but not exclusively, to web application content mapping and content adjustment using of web application content mapping.

According to some embodiments of the present invention, there are provided methods and systems of mapping visual objects to web messages which include web application content designed to be processed for modifying and/or loading a network document, such as a webpage, at a browser enabled client. The messages may be synchronous or asynchronous, for example asynchronous JavaScript and extensible markup language (XML) (AJAX) requests and/or responses. These methods and systems enable generating a dataset that allows automatic identification of web messages which include web application content for a screen element presented to user of web application, also referred to herein as a dynamic visual object, without changing the source of the web application, in a generic manner. In such a manner, the mapping allows changing elements' content automatically, outside the client and/or browser and can be applied on legacy web applications in order to update/modify web pages presented to users without updating or otherwise changing these web applications.

Optionally, in use, a proxy, or any other intermediate network node, uses the dataset for identifying web application content in web messages according to their source(s) and optionally the location of web application content therein. Then, the web application content is adjusted according to one or more rules. For example, a rule may define a conversion function, an analysis process, and/or any other routine that adjusts the web application content in a static and/or dynamic manner.

According to some embodiments of the present invention, there are provided methods and systems of automatic mapping visual objects by monitoring changes in a dynamic model of a target webpage having a plurality of dynamic visual objects, for example a document object model (DOM). In use, a plurality of web messages transmitted during loading and/or modifying the target webpage are monitored. Optionally, for each web message, for example an asynchronous data message, such as an AJAX message, changes between versions of the dynamic model before and after it is processed are detected. These changes are indicative of dynamic visual object(s) which have been adjusted in response to this processing. This allows mapping between the web message and one or more related dynamic visual objects. The mapping is performed using the origin (source) of the web message. Optionally, the web application content in the web message is identified and matched with a respective change indicated in the dynamic model. In such a manner, an exact location of web application content in the corresponding message is identified automatically and locally originated activities or modifications, for example by a user or local routine, may be filtered and not considered during the mapping. In these embodiments, data source for each screen element presented to user may be identified automatically.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident, software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a schematic illustration of a proxy system 100 that uses a mapping dataset for adjusting web application content in web messages which are sent from an identified web application content source 102, which may be any network node and referred to herein as a source, to any of a plurality of client terminals 101 over a network 105, such as the Internet, according to some embodiments of the present invention.

For example, a network node may be a host, a server, a workstation, and/or a network database and a client terminal may be laptop, a thin client, a desktop, a tablet, a Smartphone, an interactive television, or any browser enabled device. The web application content may include textual content, visual content, for example video files and images, graphical content, audible content, such as music files, and/or any other content which is designed to be presented to browsing user.

As used herein, web messages are optionally AJAX technique requests and/or responses, which are transmitted during a modification and/or loading of an active network document such as a webpage having one or more web applications. The web messages are optionally hypertext transfer protocol (HTTP) messages defined in hypertext markup language (HTML). The web application content includes data designed to be presented to users browsing a web application. A web application is understood as an application that is loaded to be hosted in a browser-controlled environment, for example a Java applet, and/or coded in a browser-supported language, such as JavaScript, combined with a browser-rendered markup language like HTML, and reliant on a common web browser to render the application executable.

The proxy 100, which is optionally a modifying proxy server, for instance as described a Squid proxy and/or a proxy defined according to the internet content adaptation protocol (ICAP), includes a monitoring module 104 which intercepts web messages transmitted to the client terminals 101. The proxy 100 further includes or connected to a database 106 which hosts one or more rules, for example in records referred to herein as adjustment records. Each rule defines an adjustment to web application content received in a web message from a certain source 102. The mapping of rules to web messages is optionally performed using a mapping dataset which is generated as described below with reference to FIGS. 3 and 4.

The rule optionally includes a function and/or instructions defining an adjustment, a change, and/or a swap which applied on certain web application content associated with a certain source. For example, the rule may be a conversion function, a translation algorithm, an image filter, a content addition, such as a graphical object addition, a video filter, an analysis process which adjusts the web application content according to an analysis thereof, for example a semantic analysis and/or the like. Exemplary rule includes a function which includes instructions to perform a language translation, transformation from Fahrenheit to Celsius or from Euros to Dollars, a context dependent rule-based reduction of sensitive information without redesigning or changing a respective web application, and/or an image filter which adds a watermark or digital rights management (DRM) tags to images.

The certain source 102 is optionally documented as a unique identifier in the record, for example an indicative uniform resource locator (URL). Optionally, the rule, for example the record, includes a pointer to the location in the web message wherein the web application content is stored, for example a field. The proxy 100 further includes an adjustment module 107 which calculates and determines, using a processor 109, on which monitored web message(s) to apply one of the rules stored in the database 105 and applies the rules accordingly, for example as described below. This proxy 100 further includes an interface 108 for forwarding the content adjusted messages to the respective client terminal(s) 101.

This proxy 100 enables automatic identification of web messages according to their sources 102 and adjustment of respective web application content therein, before they are loaded at the client side, without changing the application, in a generic manner. The proxy 100 may be used for changing web application content automatically in order to update and/or modify web applications having a legacy graphical user interface (GUI) without any changes to the web application(s).

Figure 2:
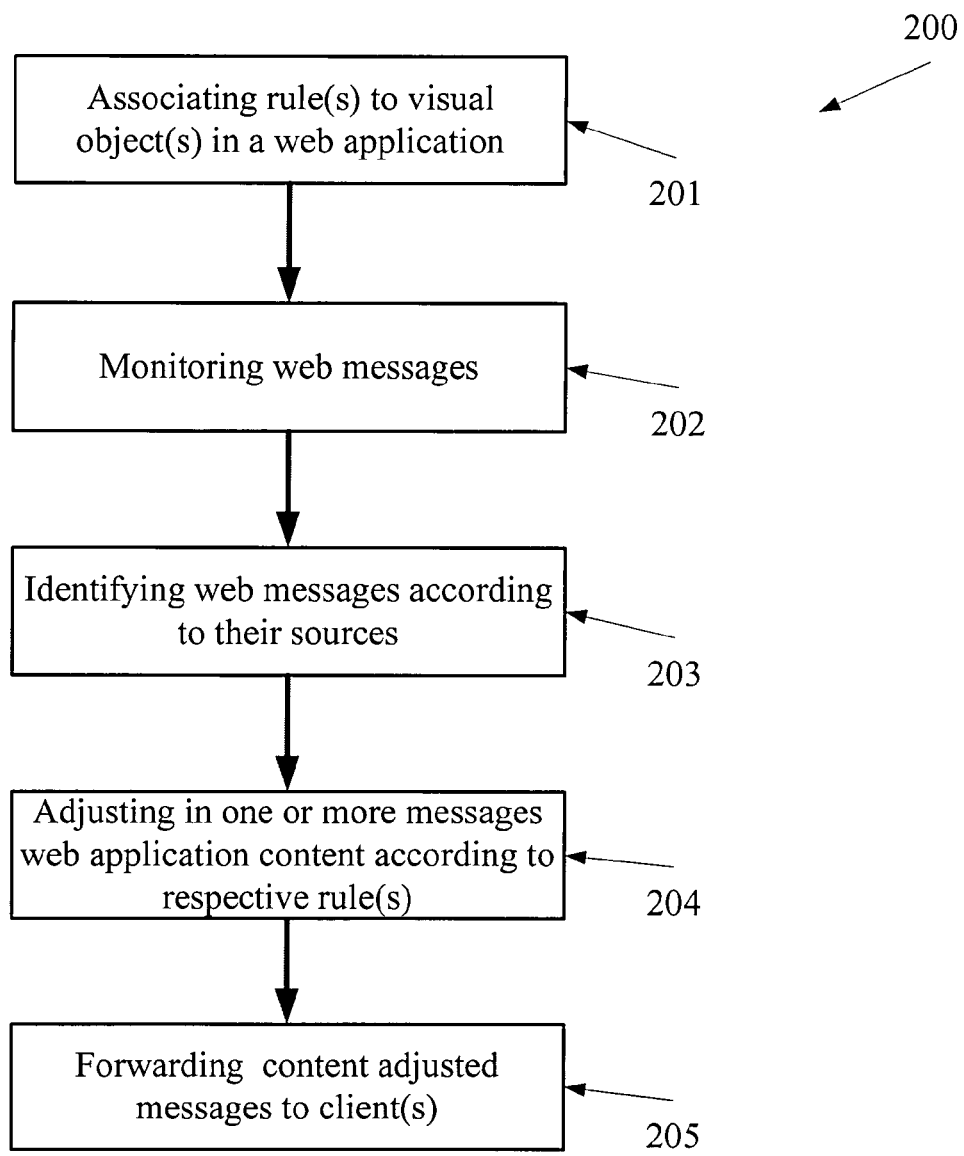
FIG. 2 is a flowchart of a method of using a proxy for adapting content encoded in web messages and designated for presentation in a network document, according to some embodiments of the present invention.

Reference is also made to FIG. 2, which is a flowchart 200 of a method of using a proxy, such as 100, for adapting content encoded in web messages and designated for presentation in an active network document loaded by a browser of a client terminal, such as 102, according to some embodiments of the present invention. The method 200, as the proxy 100, allows automatically updating and/or modifying network documents, such as webpages created by web applications without changing the code of the web applications.

First, as shown at 201, dynamic visual objects in web applications are associated with one or more rules for adjusting web application content which is designated to be displayed therein. The association may be performed by any mapping method, for example using a hash table. For instance, each dynamic visual object may be associated with one or more of the aforementioned rules. Each rule is optionally generated as described below with reference to FIG. 3.

Now, as shown at 202, web messages transmitted to a client terminal hosting a browser which loads a webpage with the above web applications and/or modifies the web applications are monitored and optionally intercepted, for example using by the aforementioned proxy 100.

As shown at 203, web messages, which are monitored at the proxy 100, are identified according to their originating source. In order to facilitate such identification, a mapping dataset, which is generated as described below, is used.

As shown at 204, the web application content encoded in some or all of the web messages are adjusted according to respective rules selected according to the identified originating source. Optionally, the location of the web application content is identified according to a pointer specified in a respective record in the database 106.

As shown at 205, the above allows forwarding the web messages with web application content that is adjusted according to respective rules to clients.

Figure 3:
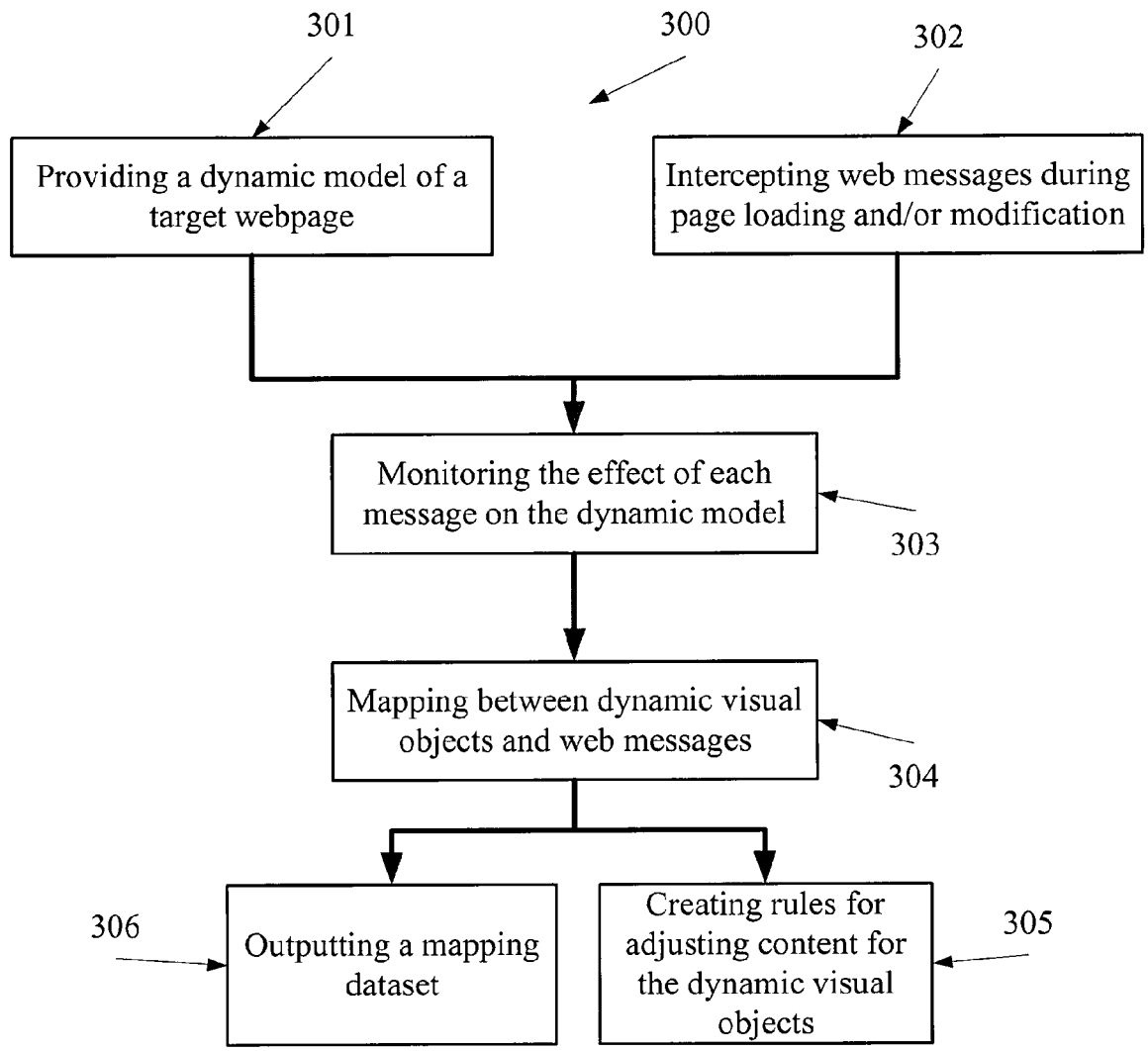
FIG. 3 is a flowchart of a method of automatic mapping between web messages and dynamic visual objects of web applications, according to some embodiments of the present invention.

Reference is now made to FIG. 3, which is a flowchart of a method 300 of automatic mapping of web messages, optionally asyncronic, to a plurality of dynamic visual objects of one or more web applications in a webpage, based on the origin of the web messages, according to some embodiments of the present invention. The mapping allows automatic adjustment of web data content that is encoded in the web messages according to rules, for example as described above.

The method 300 allows identifying a source of web application content that is used to update in a synchronous or an asynchronous manner a certain dynamic visual object. As further described below, this allows differentiating between a modification that is a result of an incoming web message (network originated modification) and a modification that is a result of a locally originated activity or modification, for example by a user or local routine. Examples of locally originated activities are new screen elements which are created or modified by JavaScript object that is activated on a timer event or in response to a user input, which may happen simultaneously with the processing of incoming web messages. Optionally, the method 300 further automatically identifies the location of the web application content within the web messages.

As further described below, the method 300 monitors changes in a dynamic model of a web page, such as a DOM, and identifies accordingly which web page modifications are network originated changes, for example originated from web messages, while filtering out locally originated changes, for example as outlined above and described below. The monitoring is optionally based on identifying modified elements of the dynamic model, for example DOM elements. These modified elements are used to map to data within the messages that had caused the change in the dynamic visual objects in the webpage.

It should be noted that method 300 automatically maps visual objects to web messages, for example according to source identifier, and optionally the location of the web application content therein, without changing the target web application(s) and/or having access to their code, thus reducing development and testing time. Moreover, the mapping according to the method 300 does not require a human expert involvement. The mapping method 300 may be implemented by a client terminal or any network node that may monitor web messages, which are transmitted to a browser loading and modifying web applications accordingly, for example by a modifying proxy or a browser enabled device and may emulate a browser and optionally respective user inputs.

Figure 4:
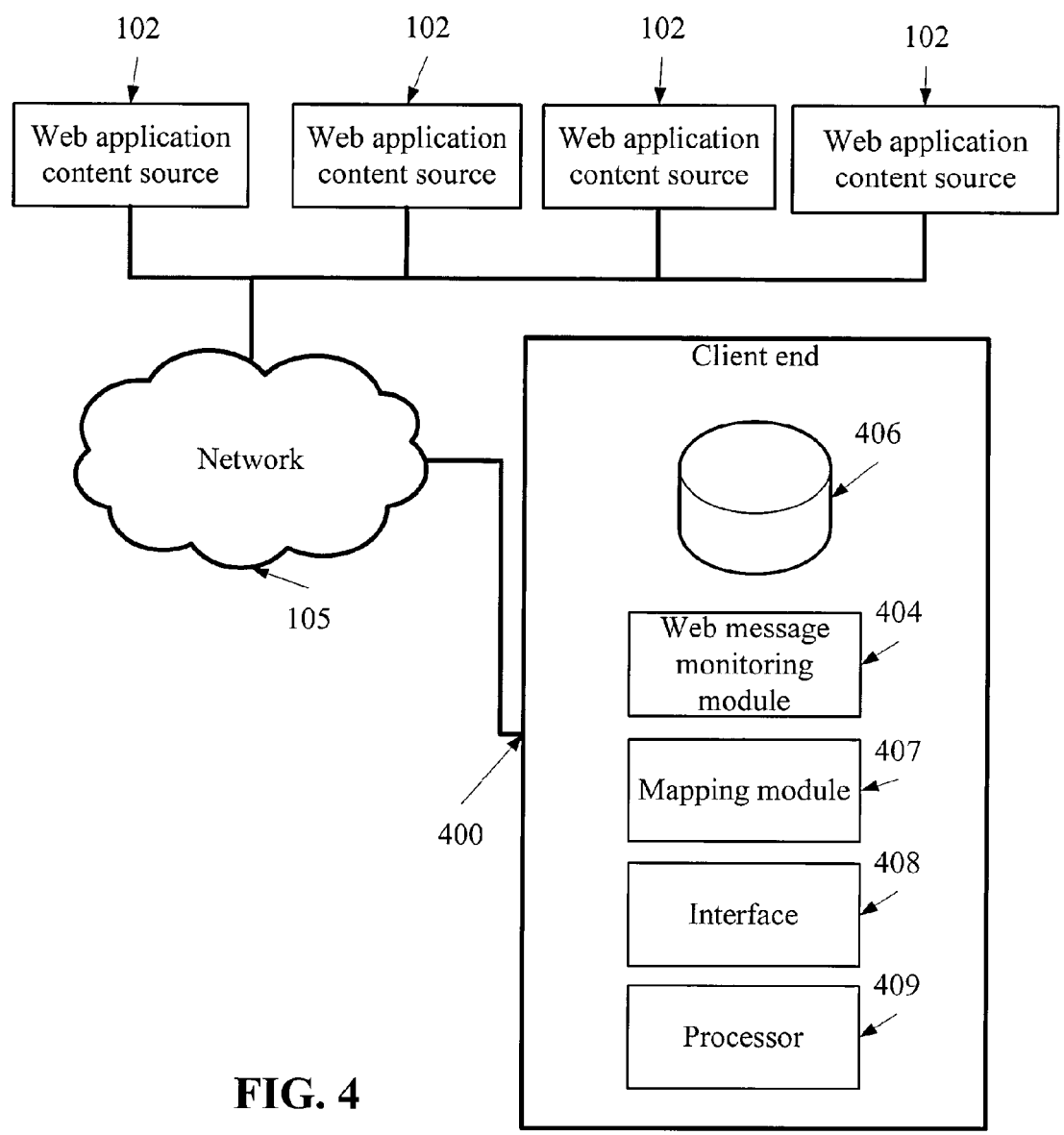
FIG. 4 is a schematic illustration of a system of automatic mapping of web messages to dynamic visual objects of web applications, according to some embodiments of the present invention.

Reference is optionally also made to FIG. 4, which is a schematic illustration of a system 400 of mapping between visual objects and web messages, according to some embodiments of the present invention. The system 400, which is connected to the network 105 and communicate with the web application content sources, for example as described above, optionally implements the method depicted in FIG. 3. The system 400 includes a processor 409 and a web message monitoring module 404 which monitors web messages transmitted during the loading and/or the modifying of a network document having dynamic visual objects by a browser or an emulated browser. The web message monitoring module 404 is optionally similar to the above described monitoring module 104. The system 400 further includes or connected to a memory which hosts a dynamic model such as a DOM. The dynamic model has model elements indicative of the dynamic visual objects. The system 400 further includes a mapping module 407 which monitors changes to the dynamic model to identify a web message(s) that affects one or more of the dynamic visual objects. The mapping module 407 automatically maps between the affected dynamic visual object(s) and web message(s) according to the source of the affecting web message.

Reference is now used to the blocks depicted in FIG. 3. As shown in 301, a dynamic model, such as a DOM, of a target webpage is automatically generated or otherwise acquired and optionally stored in the memory 406. For example, a DOM is generated by capturing a respective HTML message and removing script tags, and creating a temporal DOM, denoted herein as Dt, having a plurality of DOM elements. Optionally, for each DOM element in Dt, an entry is created in a hash table, denoted herein as Ht, where the key is the DOM element itself and the value is a combination of the uniform resource locator (URL) of the origin of the original HTTP message and the location of the data within the message, for example defined in XML path language (XPath).

As shown at 302, a plurality of web messages, optionally asynchronous, for instance AJAX requests and responses, are intercepted during a page loading and/or a page modification held by the browser, for example using the web message monitoring module 404. Optionally, the intercepting is implemented by overwriting the application programming interface (API) of native XMLHTTPRequest JavaScript object that is provided by the web browser and adding a sniffing functionality to the "send" method and the "onreadystatechange" event handler. The dynamic model is adapted according to the page loading and/or page modification.

As shown at 303, the dynamic model is monitored, for example by the mapping module 407, to identify which of the plurality of model elements has been edited, for example updated, modified, and/or added, as an outcome of any of the web messages. For example, when an asynchronous web message, such as an AJAX message, is detected, the DOM is recorded and compared with a version of the DOM after the AJAX completed.

Now, as shown at 304, one or more of the plurality of dynamic visual objects in the webpage are selected and mapped, for example by the mapping module 407. The selected dynamic visual object(s) are indicated by the edited model elements and include web application content received in one or more of the web messages. In such a manner, dynamic visual objects, which are locally adjusted, are not identified as dynamic visual objects which are affected by the any of the monitored web messages.

For example, S_Candidates denotes a set of edited DOM elements identified by the above matching. Each DOM element $e_n$ in S_Candidates probably receives a value from a web message and/or created and/or modified by a JavaScript and/or the hosting browser. Web application content, optionally textual, is identified in each $e_n$ and looked for in the web message(s). S_Verified denotes a subset of S_Candidates such that each DOM element $e_n$, in S_Verified having content that appears in the monitored web message(s). For each DOM element in S_Verified an entry in the hash table Ht is created and/or modified, where the key is the DOM element itself and the value is a combination of a unique identifier of the source of the message that contains the web application content for this element, for example a URL, and the location of the web application content within the message. In the case when URL is not unique (several different messages come from the same URL), any other type of unique message identifier can be used, for example GET/POST parameters can be considered together with URL to form a unique message identifier.

Optionally, dynamic visual objects, which are locally modified, are identified. For example, Df denotes a resulted DOM after the page has been loaded and LocalSetCandidates=diff (Df, Dt) denotes a set of candidates that have been modified locally and elements that have been modified by web messages, such as AJAX messages. For each element e in LocalSetCandidates, if there is an entry Ht[e] in the hash table Ht and Ht[e]. URL is not equal to page origin URL, e is removed from the LocalSetCandidates. For each DOM element $e_n$ in the reduced LocalSetCandidates, an entry in Ht is created or modified where the key is the DOM element itself and the value is a combination of a URL value "localhost" and a location value "null".

The result above allow mapping between the source of the web application content and the dynamic visual object which presents the web application content. For example, the hash table Ht now provides a mapping between visual elements presented to a user and web messages, optionally HTTP messages, which contain the data of these elements. As described above with reference to FIG. 1, the mapping may be used in order to modify the web application content before it is presented to user. For example, as shown at 305, one or more rules for adjusting the web application content and/or generating a new web application content therefrom are associated with each dynamic visual object so that when a message originated from a certain source is identified during respective webpage update, modification, and/or load, a respective rule is applied and the presentation to the user is adjusted. Additionally or alternatively, a dataset, for example a table or a vector, mapping between dynamic visual objects of the target webpage and web messages is outputted, for example as shown in 306, optionally using interface 408. Such a dataset may be used for traffic analysis, dynamic and/or static filtering and/or the like.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a client terminal, a network, a client network, and a source is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and the include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of mapping one or more dynamic visual objects of a network document, comprising:
monitoring a plurality of web messages transmitted during at least one of loading and modifying a network document having a plurality of dynamic visual objects by a browser of a client terminal, said web messages including web application content for said dynamic visual objects that include a screen element presented to a user of said network document by said browser, said web messages originating from a network node source are transmitted to said client terminal over a network;
providing a dynamic model having a plurality of model elements each indicative of another of said plurality of dynamic visual objects;
monitoring changes to said dynamic model to identify a first of said plurality of web messages has an effect on a first of said plurality of dynamic visual objects; and
automatically mapping, using a processor, between said first dynamic visual object and said first web message containing web application content for presentation to said user according to said network node source of said first web message, wherein activities or modifications locally originating at the client terminal are not considered during the mapping.

2. The method of claim 1, wherein said plurality of web messages are plurality of asynchronous data messages.

3. The method of claim 2, wherein said plurality of asynchronous data messages are asynchronous JavaScript and Extensible Markup Language (XML) (AJAX) technique requests or responses.

4. The method of claim 1, wherein each said web message encodes web application content that is designated to be presented by said browser.

5. The method of claim 1, further comprising identifying a location of web application content designated for said first dynamic visual object in said first web message and mapping said location with reference to said first dynamic visual object.

6. The method of claim 1, wherein said dynamic model is a document object model (DOM).

7. The method of claim 1, wherein said mapping comprises extracting a unique identifier of said source.

8. The method of claim 1, wherein said monitoring comprises filtering changes to said dynamic model which originated from a local function executed on said client terminal.

9. The method of claim 1, further comprising generating at least one rule for adapting web application content received in web messages from said source and storing said at least one rule in a proxy which applies said at least one rule according to said mapping.

10. The method of claim 9, wherein said at least one rule comprises a conversion function for converting values in said web application content.

11. The method of claim 9, wherein said at least one rule comprises an analysis function for adjusting said web application content according to an analysis thereof on said proxy, or said at least one rule comprises a pointer to a location of said web application content in a respective said first web message.

12. The method of claim 1, wherein said plurality of web messages are set to dynamically update said network document without forcing a page reload.

13. The method of claim 1, wherein monitoring comprises matching said dynamic model before and after said first web message is received and processed, and identifying at least one model element indicative of said dynamic visual object.

14. A computer program product for mapping one or more dynamic visual objects of a network document, the computer program product comprising:
a non-transitory computer readable storage medium having computer readable program code embodied therewith, the computer readable program code comprising:
computer readable program code configured to monitor a plurality of web messages transmitted during at least one of loading and modifying a network document having a plurality of dynamic visual objects by a browser of a client terminal, said web messages including web application content for said dynamic visual objects that include a screen element presented to a user of said network document by said browser, said web messages originating from a network node source are transmitted to said client terminal over a network;
computer readable program code configured to provide a dynamic model having a plurality of model elements each indicative of another of said plurality of dynamic visual objects;
computer readable program code configured to monitor changes to said dynamic model to identify a first of said plurality of web messages has an effect on a first of said plurality of dynamic visual objects; and
computer readable program code configured to map automatically between said first dynamic visual object and said first web message containing web application content for presentation to said user according to said network node source of said first web message, wherein activities or modifications locally originating at the client terminal are not considered during the mapping.

15. The method of claim 1, further comprising:
associating at least one of said plurality of dynamic visual objects and at least one rule for adjusting web application content designated to be presented in said at least one dynamic visual object according to a unique identifier of said source;
intercepting, at a proxy having a processor, a plurality of additional web messages transmitted to a client terminal hosting a browser presenting said network document;
identifying, according to said unique identifier, at least one of said plurality of additional web messages which is received at said proxy from said source;
adjusting, using said processor, web application content stored in said at least one additional web message according to said at least one rule; and
forwarding said at least one web message with said adjusted web application content, to said client terminal.

16. A system of mapping one or more dynamic visual objects of a network document, comprising:
a processor;
a web message monitoring module which monitors a plurality of web messages transmitted during at least one of loading and modifying a network document having a plurality of dynamic visual objects by a browser of a client terminal, said web messages including web application content for said dynamic visual objects that include a screen element presented to a user of said network document by said browser, said web messages originating from a network node source are transmitted to said client terminal over a network;

a memory which hosts a dynamic model having a plurality of model elements each indicative of another of said plurality of dynamic visual objects;

a mapping module which monitors changes to said dynamic model to identify a first of said plurality of web messages has an effect on a first of said plurality of dynamic visual objects and automatically maps, using said processor, between said first dynamic visual object and said first web message containing web application content for presentation to said user according to said network node source of said first web message, wherein activities or modifications locally originating at the client terminal are not considered during the mapping.

17. The system of claim 16, further comprises an interface which generates according to said mapping a dataset mapping between at least one of said plurality of dynamic visual objects and at least one rule for adjusting web application content designated to be presented in said at least one dynamic visual.

18. The system of claim 17, wherein said system is installed in a client terminal hosting said browser.

19. The system of claim 17, wherein said system is installed in a proxy emulating said browser.

20. The system of claim 17, wherein said plurality of web messages are plurality of asynchronous data messages.

21. The system of claim 20, wherein said plurality of asynchronous data messages are asynchronous JavaScript and Extensible Markup Language (XML) (AJAX) technique requests or responses.

22. The system of claim 20, wherein said dynamic model is a document object model (DOM).

23. The system of claim 20, wherein said mapping module generates at least one rule for adapting web application content received in web messages from said source and stores said at least one rule in a proxy which applies said at least one rule according to said mapping.

24. The system of claim 23, wherein said at least one rule comprises at least one of a conversion function for converting values in said web application content and an analysis function for adjusting said web application content according to an analysis thereof on said proxy.

25. The method of claim 1, further comprising, automatically adjusting said web application content encoded in said web messages according to said mapping, to update web pages presented to users of said client terminal without updating or otherwise changing the source code of the web application.

* * * * *